Patented July 14, 1936

2,047,398

UNITED STATES PATENT OFFICE 2,047,398

ARTIFICIAL RESINS AND PROCESS OF MAKING THEM

Arthur Voss and Ewald Dickhäuser, Frankfort-on-the-Main-Hochst, Germany, assignors to I. G. Farbenindustrie Aktiengesellschaft, Frankfort-on-the-Main, Germany No Drawing. Application June 17, 1931, Serial No. 545,146. In Germany June 25, 1930

16 Claims. (Cl. 260—2)

The present invention relates to artificial resins and a process of preparing them.

Processes have been proposed for making artificial masses by subjecting to polymerization a mixture of vinyl compounds or a mixture of a vinyl compound with another compound capable of being polymerized; the polymerized products are bodies of well defined properties and differ from mixtures of the corresponding separately prepared polymerization products.

We have now found that new resinous polymerization products can be made by polymerizing a compound capable of being polymerized and containing a single $>C=CH_2$ group, in admixture with a compound of the following formula

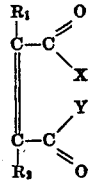

wherein $R_1$ and $R_2$ stand for hydrogen, halogen, the sulfonic acid radical or an alkyl, aryl or aralkyl radical and X and Y stand for OH, O.alkyl, O-aryl or halogen or X and Y together stand for oxygen. As such compounds there may be used for instance ethylene-$\alpha$-$\beta$-dicarboxylic acids such as maleic acid, fumaric acid, itaconic acid, citraconic acid, phenyl-maleic acid

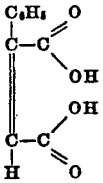

benzyl-maleic acid, dibenzyl-maleic acid, ethyl-maleic acid or an anhydride thereof, such as maleic anhydride, or another derivative thereof, for instance an ester or an acid-chloride. As compounds capable of being polymerized and containing a single $>C=CH_2$ group there may be used, for instance, vinyl esters, vinyl ethers, vinyl halides, phenylvinyl (styrene), acrylic acid and its esters, furthermore cinnamic acid esters or the like.

As the dicarboxylic acid or derivative thereof, such as maleic anhydride, itself takes an active part in the reaction, the properties of the final products are different from those of the products obtainable by carrying out the polymerization in the absence of the dicarboxylic acid or derivative thereof. If, for instance, styrene is condensed with maleic anhydride, there is obtained a resinous product which is insoluble in alcohol and benzene, but soluble in acetone, and in alkalies. The known polymerization product from styrene alone, however, is readily soluble in benzene, but insoluble in acetone and alkalies. Other vinyl compounds, such as vinyl esters, likewise yield products distinguished by altered solubilities. If the proportion of maleic anhydride used is not relatively small, they are in particular soluble in alkalies; this is an indication that maleic acid has in some manner entered into the molecule.

The quantitative proportions in which the components are used in carrying out the invention may vary within wide limits, for it appears that the components do not only react in equivalent proportions. Thus for instance 1 mol of the dicarboxylic acid and 4 mols of a vinyl compound mal be polymerized, but it is also possible to start from a mixture of 1 mol. of a vinyl compound and 4 mols of the unsaturated dicarboxylic acid. The course of the reaction cannot yet be definitely stated, owing to the difficulty of identifying the final products of high molecular weight; probably the molecule or molecules of maleic acid enter at certain places in the chain which is presumed to be produced during the polymerization process. In each case the polymerization can be conducted in a desired manner by selecting appropriate quantitative proportions and appropriate conditions of the polymerization, such as catalysts known to promote the polymerization of unsaturated compounds, temperatures and diluents. The invention is not limited to the polymerization of a mixture of two components; a mixture of monomeric olefinic compounds may likewise be used. It is thus possible to carry out the process in various ways and to obtain a large variety of hitherto unknown polymeric compounds.

The products may be polymerized in the usual manner by heating; temperatures between about 50° C. and about 150° C. are generally applied.

Instead of polymerizing an olefinic compound capable of polymerizing in admixture with a derivative of an ethylene-$\alpha$-$\beta$-dicarboxylic acid, the olefinic compound is polymerized in admixture with an ethylene-$\alpha$-$\beta$-dicarboxylic acid or the anhydride thereof and the product is converted into a derivative by reaction with an organic substance known to be capable of reacting with carboxylic acid or anhydride groups.

It is surprising that the polymerization products obtainable from polymerizable olefinic compounds and ethylene-α-β-dicarboxylic acids or anhydrides are capable of entering into further chemical reactions, and that the carboxyl groups or the corresponding anhydride groups have maintained to a considerable extent their capacity for reaction. They are not only capable of forming salts, for instance the salts of alkalies, of alkaline earths or the like, but they may be alkylated or amidated or they may be caused to react with polyhydric alcohols or with polymerized alcohols, such as glycol or glycerine, polyglycerine and polyvinyl alcohol, whereby resinous products are obtainable which resemble the glycerinphthalic acid resins but have a considerably higher elasticity. Furthermore, the resinous products containing carboxyl or carboxylic anhydride groups may be caused to react with a monohydric phenol such as cresol, napthol or a polyhydrid phenol such as resorcin or with a primary, secondary or tertiary amine such as aniline, di- and trimethylamine. By means of these reactions it is also possible to introduce new radicals which are capable of further transformation, such as nitro-groups, amino-groups, hydroxyl-groups, carboxyl-groups, sulfo-groups or halogen.

By a modification of the invention, the new resinous products can in some cases be made by combining into one operation the polymerization and reaction with a compound capable of reacting with carboxylic acid or anhydride groups. If, for example, a vinyl compound is caused to react simultaneously with maleic anhydride and glycol, it is possible to obtain a polymeric condensation product which is no longer soluble in alkalies and is therefore probably a glycol ester of the product obtainable from the vinyl compound and maleic anhydride alone; according to the conditions of the reaction the products obtained may be soluble in organic solvents or only capable of swelling or even completely insoluble therein.

The new condensation products are valuable artificial materials and are suitable for use for the most varied industrial purposes, for instance, for the manufacture of lacquers, impregnating materials, electrical insulating materials, adhesives, and formed articles; they are also useful as assistants in the textile or like industries.

The resins obtained according to the invention have valuable properties. The products obtained, for instance, by esterification with polyhydric alcohols have the advantage, in comparison with the known glycerin-phthalic acid resins, that the parent material used for the esterification is highly polymerized and that the resins, therefore, possess a high elasticity.

The following examples illustrate the invention, but they are not intended to limit it thereto, the parts being by weight:

(1) 120 parts of maleic anhydride are dissolved or suspended in 105 parts of styrene and the mixture is cautiously heated on a water bath. The reaction which occurs can be moderated by cooling or by raising the temperature of the mixture very slowly. A hard, homogeneous, slightly yellow to colorless mass is soon formed. The product is a resin which is insoluble in alcohol and benzene, but soluble in acetone and dilute aqueous alkali. It may be purified by repeated precipitation with acid from an alkaline solution.

(2) A solution of 50 parts of maleic anhydride in 106 parts of styrene is heated on the water bath in the manner described in Example 1. A light-colored resin is produced which is soluble in acetone to a clear solution and forms a suspension in alkalies. For eliminating a small quantity of parent material, the new polymerization product may be subjected to repeated precipitation from its solution in acetone by means of alcohol, whereby flakes of a perfectly white color are obtained.

(3) 60 parts of methyl-styrene, 50 parts of maleic anhydride, 50 parts of acetone and 0.4 part of benzoyl superoxide are heated in the manner described in Example 1 for 14 hours on a water-bath. The polymerization occurs gradually, the viscosity of the solution increasing until a plastic mass is formed. The product is soluble in alkali.

(4) 50 parts of maleic anhydride and 0.6 part of benzoyl superoxide are dissolved in 86 parts of vinyl acetate, and the solution is caused to run slowly through a condenser into a glass or aluminium vessel which is heated on a water-bath to a temperature of 80° C.–90° C. There is obtained a light-colored, transparent resin in form of a hard block which can be comminuted by mechanical means. The resin is soluble in acetone, but insoluble in alcohol and benzene. It can be saponified similarly to the polyvinyl esters. There is obtained a highly polymeric body which probably contains hydroxyl and carboxyl-groups in alternation. If this body is heated, for instance by evaporating its solution there are obtained insoluble masses, because apparently the hydroxyl-groups react with the carboxyl-groups (inner-formation of ester).

(5) 80 parts of vinyl chloride, 100 parts of maleic anhydride, 0.5 part of barium peroxide and 1.2 parts of acetic anhydride are heated together for 16 hours at 80° C. in an autoclave lined with sheet aluminium, while stirring. When the autoclave is opened only a small quantity of vinyl chloride escapes, the main quantity having taken part in the reaction. The polymerization product is a white powder which contains 14 per cent. of chlorine and is soluble in dilute alkalies and in water.

(6) 72 parts of vinyl ethyl ether and 98 parts of maleic anhydride are heated for 12 hours at 110° C. in an autoclave lined with aluminium. There is obtained a transparent mass which is soluble in acetone and dilute alkali.

(7) 1000 parts of solvent naphtha which has been freed from bases and phenols, boils between 140° C. and 240° C. and contains about 20 per cent. of resinifying constituents consisting of styrene, cyclopentadiene, coumarone, indene and alkyl derivatives of these unsaturated compounds, are mixed with 180 parts of maleic anhydride and the mixture is gently boiled for several hours. The volatile constituents are then eliminated by distillation with steam. The resinous residue is treated with a hot aqueous solution of sodium carbonate, the insoluble portion is removed by filtration and dilute hydrochloric acid is added to the filtrate, whereby a voluminous precipitate is produced; it is washed and dried under reduced pressure. There is obtained a yellowish to grey resinous mass which is readily soluble in dilute alkalies and is suitable as a substitute for shellac for dressing, polishing, impregnating and insulating purposes.

(8) Equal quantities of indene and maleic anhydride are heated for 12 hours at 100° C. in an aluminium vessel. The mass polymerizes to an elastic, slightly yellow resin, which is soluble in acetone and aqueous alkali.

(9) 120 parts of coumarone and 100 parts of maleic acid dimethyl ester are heated in an autoclave for 12 hours at 120° C. There is produced a plastic, light yellow resin which is soluble in alcohol and acetone and can easily be saponified; the saponification product is soluble in alkalies.

(10) 175 parts of cinnamic acid ethyl ester are mixed with 100 parts of maleic anhydride and the mixture is caused to run slowly into a vessel maintained at the temperature of the water bath. When all the mixture has been introduced, it is heated for some time to a temperature of 120° C.–140° C. The reaction mixture solidifies to a plastic, homogeneous block, which constitutes a resin soluble in acetone and alkali and insoluble in alcohol and benzene.

(11) A mixture of 100 parts of para-hydroxystyrene and 120 parts of citraconic anhydride are heated for 10 hours to 120° C. in a vessel provided with a reflux condenser. There is obtained a hard, transparent, slightly yellow resin which, like the products described in the preceding examples, dissolves in dilute aqueous alkalies to a viscous solution.

(12) A mixture of 70 parts of vinyl-methylketone with 110 parts of itaconic acid and 100 parts of acetone is boiled for several hours, whereby the polymerization occurs to a resinous mass which is soluble in aqueous alkalies.

(13) A solution of 70 parts of maleic sulfonic acid (Rec. Pays. Bas vol. 49, pages 735–744) in 50 parts of styrene is heated for 12 hours on a water-bath. There is obtained a brownish-yellow product which is soluble even in water and yields highly viscous solutions. The product is useful as an assistant in the textile industry.

(14) 60 parts of acrolein are mixed with 300 parts of the maleic acid ester which can be prepared in known manner from maleic acid and a fatty alcohol obtainable by subjecting coconut oil, methyl iodide and magnesium to the Grignard reaction. The mixture is heated for several hours at a temperature between 110° C. and 120° C. On cooling, the polymerization product solidifies to a colorless, glassy mass, which is comminuted by rasping and freed from the adherent volatile substances by exposing it to reduced pressure at a temperature between 40° C. and 50° C. Any unchanged maleic acid ester is removed by extraction with alcohol. The product is a yellowish, very elastic mass which is insoluble in acids, alkalies and organic solvents; it can be used for preparing formed articles with the aid of heat.

(15) 100 parts of styrene are mixed with 150 parts of fumaric acid dichloride and the mixture is heated on a water-bath in the manner described in Example 1 in a vessel provided with a reflux condenser. A violent reaction takes place. In a few hours the reaction mixture has polymerized to a hard, colorless to brownish-yellow block. When boiled with aqueous alkalies the resin thus obtained yields highly viscous solutions, from which the resin is reprecipitated by acidification.

(16) A mixture of equal quantities of styrene, vinyl acetate and maleic anhydride is heated, while thoroughly stirring. In order to moderate the reaction when operating on a large scale, the mixture may either be diluted with acetone or it may be caused to run slowly into the reaction vessel in proportion as the polymerization proceeds. When the polymerization is complete, that is when the viscosity of the polymerized product no longer increases, the reaction is discontinued and the acetone, if used, is eliminated by distillation under reduced pressure. There remains a colorless, homogeneous, hard elastic block of resin which can be comminuted, conveniently by chipping.

The resin obtained is polymerized to a considerably higher degree than that obtained by polymerizing styrene and vinyl acetate in absence of maleic anhydride. A like result is obtained even if a considerably smaller proportion of maleic anhydride is used. The solubility of the product obtained varies within certain limits according to the proportions of maleic anhydride used. This is also the case if the quantitatve proportions of the other components (styrene and vinyl acetate) are likewise varied.

(17) 0.5 part of maleic acid diallyl ester is dissolved in 100 parts of monomeric styrene and the mixture is polymerized by heating it for about 20 hours at 160° C. The polymerization product obtained is soluble in benzene. Its tensile strength is increased by about 80 per cent. as compared with that of the polymerization product of pure styrene, and its resistance to heat is improved.

(18) 15 parts of maleic acid diallyl ester are dissolved in 100 parts of styrene and the solution is heated for 20 hours at 160° C. in a vessel provided with a reflux condenser. There is formed a colorless, limpid polymerization product which is insoluble in benzene; it has a very good resistance to heat, being substantially infusible.

(19) 22 parts of maleic acid mono-phenyl ester (see "Berichte der deutschen chemischen Gesellschaft", vol. 39, p. 4086) are mixed with 160 parts of tetrahydronaphthylvinyl; the mixture is gradually heated to about 120° C. and kept at this temperature for several hours until the polymerization has rather proceeded, that is, until the mass has become very viscous. The mass is then kept for 2 hours at 140° C. and for 2 hours at 160° C. After cooling, the mass solidifies to a limpid solid final product which is soluble in various solvents, particularly in aromatic hydrocarbons and halogenated hydrocarbons. It is, however, insoluble in aqueous alkalies in spite of the free carboxylic groups contained therein.

(20) 135 parts of chloro-maleic acid (see "Annalen der Chemie", vol. 280, p. 229) are mixed with 180 parts of stilbene and 100 parts of 1.1-dichlorethane and the mixture is heated in a pressure vessel for 10 hours at 70° C., for further 5 hours at 100° C. and finally for 6 hours at 120° C. The content of the vessel constitutes a whitish yellow, hard mass which is sparingly soluble in organic solvents, but readily soluble in aqueous alkalies.

(21) 16 parts of phenyl-maleic anhydride (see "Annalen der Chemie", vol. 258, p. 76) are mixed with 31 parts of vinyl chloride and 53 parts of acetone and the mixture is heated in a pressure vessel for 4 hours at 70° C., for 6 hours at 100° C. and for further 10 hours at 120° C. The content of the vessel is caused to cool and it is then reduced to small pieces. After evaporation of the acetone and of a small quantity of the non-polymerized vinyl chloride, a whitish, crumbly or pulverized mass is obtained, which dissolves rather readily in alkalies.

(22) 100 parts of the polymerization product made according to Example 1 are heated for 7–8 hours at boiling temperature together with 80 parts of absolute ethanol. A colorless, viscous solution is produced from which the unchanged parent material can be washed out by means of sodium carbonate solution. The reaction product itself is no longer soluble in alkali, but is readily soluble in alcohol and acetone.

(23) 70 parts of vinyl ethyl ether are mixed with a solution of 100 parts of maleic anhydride in acetone and 40 parts of glycol; after the addition of 0.5 part of benzoyl superoxide the mixture is kept gently boiling. After a few hours the solution commences to become viscous. It is kept for about 12 hours at the boiling point (reckoned from the commencement of the boiling) and the acetone and the unaltered ether are then eliminated by distillation under reduced pressure. The residue is washed with hot water and dried. The product is a colorless to white mass which is readily soluble in alcohol and acetone, but insoluble in alkalies.

(24) 100 parts of styrene, 95 parts of maleic anhydride and 60 parts of glycerine are heated in an autoclave for 8 hours at 120° C. There is obtained a hard white mass which is insoluble in sodium carbonate solution and in organic solvents, such as benzene, alcohol, dioxane, acetone or the like.

(25) 100 parts of styrene and 100 parts of maleic anhydride are heated together for several hours. As soon as the polymerization begins 180 parts of phenol are added and the whole is heated for 10 hours in an autoclave at 140° C. There is formed a brownish-yellow solid mass which is insoluble in dilute alkalies and in organic solvents.

(26) 85 parts of vinyl acetate and 100 parts of maleic anhydride are mixed with about 250 parts of ethanol; 0.6 part of benzoyl superoxide is added and the mixture is kept boiling. After some hours the mass commences to become very viscous. When the viscosity of the mass no longer increases, it is washed with hot water, and then dried under reduced pressure at about 50° C. There is obtained a whitish, very elastic mass of a fibrous nature; it is readily soluble in acetone, alcohol and benzene.

(27) 200 parts of the polymerization product obtainable from equimolecular quantities of styrene and maleic acid as described in Example 1 are dissolved in four times the quantity of methanol. To the solution is added a solution in ethyl-alcohol of 120 parts of a polyvinyl alcohol made by partially saponifying polyvinyl acetate and still containing about one-third of the original content of acetyl-groups. The solutions mix with one another and yield a clear solution. The solvent is eliminated by evaporation under reduced pressure, whereby there is obtained a light-colored horny mass which becomes insoluble when heated to a temperature between about 130° C. and 160° C. During this process esterification of the carboxyl-groups of the polymerization product by reaction with the hydroxyl groups of the polyvinyl alcohol probably occurs.

(28) 200 parts of polymerization product obtained by heating equal quantities of styrene and maleic anhydride and still containing the dicarboxylic acid in the form of the anhydride, are mixed with twice the quantity of the fatty alcohol obtained by catalytic reduction of palmitic acid and the mixture is heated in an autoclave at about 130° C.–150° C. while thoroughly stirring. Completion of the reaction, which involves the formation of an acid ester, is indicated by the fact that the reaction mass no longer dissolves in dilute alkalies to a clear solution but forms an emulsion. The mass is thereupon freed from excess of the fatty alcohol by extraction with hot alcohol. The residue constitutes a whitish-yellow, gummy mass which is insoluble in water and forms an emulsion with aqueous alkalies. The product is insoluble or capable of swelling more or less in most organic solvents. In some very powerful solvents, such as cyclic ketones or chlorinated hydrocarbons, the product dissolves to very viscous solutions. The product is useful for impregnating textile fibers.

(29) 75 parts of acrylic acid are mixed with 100 parts of maleic anhydride, 50 parts of acetone and 250 parts of a fatty alcohol obtained by subjecting linseed oil, methyl iodide and magnesium to the Grignard reaction. Dissolution occurs when the mixture is heated. The temperature is gradually raised to the boiling point of acetone and the whole is gently boiled until it has become very viscous and solidifies on cooling to a gelatinous mass. The mass is comminuted and freed from adherent acetone and unchanged fatty alcohol by means of hot ethanol. There is obtained a product of somewhat higher solubility, particularly in alkalies, than that obtained according to the preceding example. It may likewise be used for impregnating textile fibers.

(30) 60 parts of vinyl chloride and 90 parts of maleic anhydride are subjected to polymerization; 100 parts of cyclohexanol and 100 parts of tetrachlorethane are then added to the polymerization product, and the mixture is kept for some hours at about 100° C. while thoroughly stirring. The volatile portions are then eliminated from the reaction mixture by distillation with steam. By drying the product, there is obtained a whitish mass resembling cellulose; it dissolves somewhat freely in aromatic hydrocarbons, but more freely in mixtures of organic solvents, such as a mixture of benzene and alcohol; it is insoluble in water and forms an emulsion in aqueous alkalies.

We claim:

1. The process which comprises polymerizing a compound of the following formula:

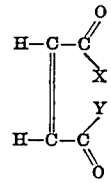

wherein X and Y stand for OH, O.alkyl, O-aryl or halogen or X and Y together stand for oxygen together with an organic compound capable of being polymerized and containing a single >C=CH₂ group.

2. The process which comprises polymerizing a compound of the following formula:

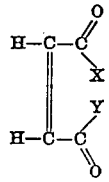

wherein X and Y stand for OH, O.alkyl, O-aryl or halogen or X and Y together stand for oxygen together with an organic compound capable of being polymerized and containing a single >C=CH₂ group in the presence of an organic compound selected from the group of compounds capable of reacting with carboxylic acid groups consisting of alcohols and amines.

3. The process which comprises polymerizing maleic anhydride together with a compound capable of being polymerized and containing a single >C=CH₂ group.

4. The process which comprises polymerizing maleic anhydride together with a compound capable of being polymerized and containing a single >C=CH₂ group in the presence of an organic compound selected from the group of compounds capable of reacting with carboxylic acid groups consisting of alcohols and amines.

5. The process which comprises polymerizing maleic anhydride together with a compound capable of being polymerized and containing a single >C=CH₂ group in the presence of an alcohol.

6. The process which comprises polymerizing maleic anhydride together with styrene.

7. The process which comprises polymerizing maleic anhydride together with styrene in the presence of a polyhydric alcohol.

8. The process which comprises polymerizing maleic anhydride together with styrene in the presence of polyvinyl alcohol.

9. The artificial resin obtainable by polymerizing a compound of the following formula:

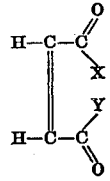

wherein X and Y stand for OH, O.alkyl, O-aryl or halogen or X and Y together stand for oxygen together with an organic compound capable of being polymerized and containing a single >C=CH₂ group, said product forming a viscous to hard and elastic, yellow to colorless mass.

10. The artificial resin obtainable by polymerizing a compound of the following formula:

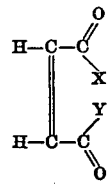

wherein X and Y stand for OH, O.alkyl, O-aryl or halogen or X and Y together stand for oxygen together with an organic compound capable of being polymerized and containing a single >C=CH₂ group in the presence of an organic compound selected from the group of compounds capable of reacting with carboxylic acid groups consisting of alcohols and amines, said product forming a viscous to hard and elastic, yellow to colorless mass.

11. The artificial resin obtainable by polymerizing maleic anhydride together with a compound capable of being polymerized and containing a single >C=CH₂ group, said product forming a viscous to hard and elastic, yellow to colorless mass.

12. The artificial resin obtainable by polymerizing maleic anhydride together with a compound capable of being polymerized and containing a single >C=CH₂ group in the presence of an organic compound selected from the group of compounds capable of reacting with carboxylic acid groups consisting of alcohols and amines, said product forming a viscous to hard and elastic, yellow to colorless mass.

13. The artificial resin obtainable by polymerizing maleic anhydride together with a compound capable of being polymerized and containing a single >C=CH₂ group in the presence of an alcohol.

14. The artificial resin obtainable by polymerizing maleic anhydride together with styrene, said product forming a hard, slightly yellow to colorless mass, soluble in acetone and dilute aqueous alkali, insoluble in alcohol and benzene.

15. The artificial resin obtainable by polymerizing maleic anhydride together with styrene in the presence of a polyhydric alcohol, said product forming a plastic slightly yellow to colorless mass soluble in alcohol and acetone, insoluble in alkali.

16. The artificial resin obtainable by polymerizing maleic anhydride together with styrene in the presence of polyvinyl alcohol, said product forming a light-colored, horny mass, insoluble in organic solvents.

ARTHUR VOSS.
EWALD DICKHÄUSER.